Patented June 17, 1941

2,245,772

UNITED STATES PATENT OFFICE 2,245,772

LUBRICANT

Nelson J. Gothard and George Entwistle, Jr., Chicago, Ill., assignors to Sinclair Refining Company, New York, N. Y., a corporation of Maine No Drawing. Application September 21, 1939, Serial No. 295,911

10 Claims. (Cl. 252—41)

This invention relates to an improved grease lubricant of the type particularly adapted to the lubrication of highly stressed bearings such as those of the connecting rods of the driving mechanism of locomotives and generally known to the art as locomotive rod cup or crank pin grease.

The tremendous forces exerted by a locomotive are transmitted to the driver wheels from the piston rods by means of mechanical linkages, designated connecting rods, connected by pins known as crank pins. These pins constitute the shafts about which the journals of the connecting rods rotate. Due to space restrictions, the diameter and length of these pins are limited so that the stresses per unit area of the bearings are normally much greater than those usually encountered in other machines. This highly stressed condition is further aggravated by the rapid pounding, reciprocating forces of the piston, the dusty environments in which the bearings normally function and the extreme temperature conditions to which the bearings are subjected.

For years it was general practice to lubricate these connecting rod bearings by feeding a grease lubricant into the bearing by means of conventional grease cups known as rod cups attached to each of the bearings and from this fact the designation "rod cup grease" is derived. Rod cups are still in use on some locomotives but more modern locomotives are usually equipped with "Alemite" fittings through which the grease is fed by means of a grease gun operated either by hand or by air pressure.

Rod cup grease is usually relatively hard and is supplied to the grease cups or grease guns in the form of sticks ranging from ⅞ inch to 2 inches in diameter. The grease is forced from the cups or guns through ducts or fittings leading to the bearing surfaces. The amount of grease which such cups will hold or which can be supplied by the guns at any one time is, of course, limited. The grease must be sufficiently soft to feed adequately through the cups or guns and the fittings and ducts leading to the bearing surfaces and yet remain sufficiently hard under operating temperature conditions as to avoid too rapid feeding and wasting out of the bearing. Since it is impossible to inspect the bearings or replenish the grease supply while the locomotive is in motion, any defective lubrication is frequently not detected until an overheated bearing has developed, often causing serious damage to the bearing and delay in train schedule. For these reasons the lubrication of these pins is a unique problem and has been the subject of an enormous amount of research in recent years.

For many years these connecting rod bearings were almost universally lubricated by a grease made by the saponification, with an aqueous caustic soda solution, of tallow which had been previously mixed with a high grade lubricating oil known as cylinder stock. The product consisted of approximately 50% soda soap, lubricating oil and a quantity of water and glycerine. This lubricant was reasonably satisfactory for the operating conditions of twenty years ago. However, in recent years the size and speed of locomotives have been greatly increased and the length of runs, without changing locomotives or servicing them, has likewise been greatly increased until at present our fast passenger trains are often run for distances over one thousand miles without changing locomotives and at speeds frequently as high as ninety miles per hour.

Under such severe conditions the old type grease proved unsatisfactory and a new type was developed in which the water and glycerine were replaced by further quantities of cylinder stock.

Grease is primarily a lubricating oil thickened or solidified by the addition of soap. It is principally the oil which does the lubricating and the soap is added to stiffen or solidify the oil and prevent it from feeding too fast and running out from between the bearing surfaces. As the temperature of the bearing is increased the grease becomes progressively softer and if it becomes too soft it feeds too rapidly and is wasted. Such waste is not only poor economy but may lead to the exhaustion of the grease supply in the bearings and fittings and result in a pin failure.

To avoid excessive softening it has been customary to increase the proportion of soap where high temperatures were likely to be encountered. However, as the proportion of soap is increased the proportion of oil is necessarily decreased with a consequent decrease in the lubricating ability of the grease. Such decrease in the lubricating ability of the grease results in increased friction and, consequently, a higher operating temperature of the bearing and, unless this tendency is checked, a bearing failure will result.

In more recent years the problem with which the art has been confronted is the adjustment of the proportions of oil and soap for a particular condition so that the grease will be sufficiently hard to avoid too rapid feeding and yet contain sufficient oil to properly lubricate the bearing and prevent overheating. The art has had to compromise between ideal lubrication and the physical difficulty of preventing too rapid feeding and waste of the grease. This has resulted in both frequent lubrication failures and poor economy by reason of the additional amount of servicing of the locomotive required and by reason of the large amount of grease thrown out of the bearing by the reciprocating or centrifugal forces.

Our invention relates specifically to a new grease product having improved lubricating properties and adapted to maintain ideal lubrication and consequent low bearing temperatures with an unusually low consumption and little or no waste. Both with respect to its composition and its physical appearance, our new grease is distinctly different from conventional rod cup greases. Such conventional greases under normal temperature conditions are usually quite hard having a coarse laminated or fibrous structure from which they derive their name "fiber grease." Their soap component is usually prepared from high-grade commercial stearic acid and their mineral oil component has almost invariably been of the highest-grade cylinder stock.

We have discovered that, by radical departure from the conventional practice, we can produce a rod cup grease lubricant which, from the standpoint of lubrication and low consumption, is distinctly superior to any grease heretofore known to us. It does not have the coarse fibrous structure of conventional rod cup greases but is extremely smooth and homogeneous in appearance. Also, for a given proportion of soap, it is unusually firm and capable of withstanding higher temperatures without unduly softening yet its lubricating ability is so superior that abnormally high bearing temperatures are thereby prevented.

In place of the high-grade cylinder stock normally used, we use a by-product from a lubricating oil refining process, not previously known to be useful as a lubricant, and as the soap component we use a soda-soap prepared from hydrogenated fish oil fatty acid.

The fatty acid which we have found particularly useful for this purpose is one marketed by Werner G. Smith Company of Cleveland, Ohio under the tradename "Hydrofol Acid No. 51" having the following specifications:

| | |
|---|---|
| Free fatty acid (as oleic) | 95% or higher |
| Saponification number | 193 or higher |
| Titer | 53–55° C. |
| Iodine value (Wijs method) | 6.0 or less |

In preparing this fatty acid the fish oil is first hydrogenated and the resulting hydrogenated product is then split producing a fatty acid which is relatively hard and dry, somewhat resembling commercial stearic acid in appearance except for the lack of the sharp crystalline structure characteristic of such stearic acid.

The mineral oil constituent of our improved grease consists of a mixture of what is known to the trade as "neutral oil" and a mineral oil residuum referred to herein as "extract."

This extract is a heavy, sticky, asphaltic residual oil having a viscosity of about 1000–1200 seconds Saybolt Universal viscosity at 210° F., resulting from a nitrobenzene-sulphuric acid solvent extraction process in the manufacture of lubricating oils from Pennsylvania reduced crude.

To better define this extract we shall describe one particular process by which it may be obtained:

A Pennsylvania crude is reduced by conventional distillation methods until there remains only about one-fifth of the original crude as a residuum, having a gravity of approximately 25 A. P. I.; a Cleveland open cup flash of 540° F.; a Saybolt Universal viscosity of about 165 seconds at 210° F.; a pour test of approximately 40; and a carbon residue test of approximately 3%. This reduced crude is then subjected to the solvent extraction process which consists of four countercurrent stages of mixing and settling connected in series. The reduced crude enters the first stage of mixing and flows toward the fourth stage of settling. Fresh nitrobenzene enters the fourth stage of mixing and flows toward the first stage of settling. Sulfuric acid of 98% strength is added to the first stage of mixing. There is a temperature gradient of from about 60° F. on the first stage of settling to 80° F. on the fourth stage of settling. The ratio of fresh nitrobenzene charged to raw reduced crude may vary but is usually about 0.55 to 1 by volume and the amount of acid used is usually 2.0–2.5 pounds of acid for each barrel of reduced crude. The oil leaving the fourth settling stage containing dissolved nitrobenzene is known as raffinate and is of no present interest. A strata of nitrobenzene containing constituents dissolved from the oil forms in the first settler. This is withdrawn and neutralized with soda ash or anhydrous ammonia and the whole filtered to remove solid sodium or ammonium sulfate. The nitrobenzene is then separated from the oil constituents dissolved therein by steam distillation under vacuum, leaving the oil constituents herein referred to as "extract" which represents approximately 10% by volume of the reduced crude treated. This extract contains the more asphaltic and naphthenic portions of the lubricating fraction of the crude which are generally considered undesirable in lubricating oil and a purpose of the solvent extraction treatment is the separation of this extract from the lubricating oil.

The neutral oil constituent is preferably a Pennsylvania neutral oil known as 150 viscosity neutral and having a Saybolt Universal viscosity of about 150 seconds at 100° F. Other neutral oils have been used with advantage such, for example, as Pennsylvania 70 viscosity neutral having a Saybolt Universal viscosity of approximately 70 seconds at 100° F. However, we prefer to use the 150 viscosity neutral because of its lower volatility and superior lubricating properties.

Though we have found that the ratio of extract to neutral oil in the mineral oil constituent of the grease may be varied somewhat, we prefer to use a mixture consisting of extract cut back with the 150 viscosity neutral oil to a Saybolt Universal viscosity of about 400 seconds at 210° F. This viscosity results from approximately 85% extract and 15% of the 150 viscosity neutral oil. We have used a mixture consisting of 75% extract and 25% of 70 viscosity neutral oil such mixture having a Saybolt Universal viscosity of approximately 180–190 seconds at 210° F., with excellent results but prefer to use the higher proportion of the extract and the heavier neutral oil in greases intended for most severe conditions.

Our improved grease is compounded by what is known generally as the fiber grease process whereby the fatty acid and a portion of the mineral oil constituent are placed in a steam jacketed kettle equipped with a stirring device and heated until the fatty acid has become liquid at which time an aqueous caustic soda solution is gradually added in an amount sufficient to neutralize the fatty acid. When all of the caustic has been added the temperature is raised until the reaction is completed and substantially all of the water has been driven off as vapor. The remainder of the mineral oil constituent is then gradually added and the heating continues until all the oil has been uniformly worked into the grease, at which time it is withdrawn from the kettle and placed in containers. Stirring is continued during the entire process.

It is characteristic of this process that the temperature of the batch of grease at no time during the operation reaches the point at which the finished product would be liquefied. The maximum temperature attained is usually not over 300° F.

Various modifications of this process are used, with little or no change in results, according to the dictates of the particular greasemaker. We have obtained most satisfactory results by initially adding approximately two-thirds of the mineral oil constituent with the fatty acid and heating the mixture to approximately 170° F., before adding the caustic soda. The caustic soda solution is prepared from approximately equal proportions of commercial caustic soda and water, by weight. After the addition of caustic soda, the temperature is raised to about 230° F. until the mixture has subsided in the kettle and has substantially thickened, at which time the temperature is raised to approximately 270° F. and the remainder of the oil gradually added.

The proportions of mineral oil and soda soap components may be varied somewhat depending upon the normal operating temperature of the bearing to be lubricated. Usually a higher proportion of soap is used in summer than in winter. We have found proportions ranging from approximately 35% and and 64% oil to approximately 45% soap and 54% oil to give particularly good results under conditions usually encountered on heavy high-speed locomotives. The lower proportions of soap are adapted particularly for winter use but are found to give excellent results for year around use in moderate climates or on bearings which normally operate at moderate temperatures.

In order that the compounding of our improved grease may be better understood, the following specific examples are given. In each case the fatty acid used was "Hydrofol acid No. 51," previously described, and the mineral oil constituent was a mixture of extract and Pennsylvania neutral oil. The extract in each case had a Saybolt Universal viscosity of 1200 seconds at 210° F. and resulted from the solvent extraction treatment previously described. Also, in each case, the grease was made by the fiber grease process noted above.

Batches No. 1 and No. 2

These batches of grease were prepared from the following ingredients and proportions thereof:

|  | No. 1 | No. 2 |
| --- | --- | --- |
|  | Percent | Percent |
| "Hydrofol acid No. 51" | 34.4 | 37.9 |
| Flake caustic soda | 4.8 | 5.3 |
| Water | 4.8 | 5.3 |
| Mineral oil constituents | 56.0 | 51.5 |

Analysis of the finished grease product was as follows:

|  | No. 1 | No. 2 |
| --- | --- | --- |
|  | Percent | Percent |
| Soda soap | 41.69 | 45.99 |
| Unsaponified saponifiable matter | 0.89 | 0.68 |
| Free caustic | 0.16 | 0.07 |
| Mineral oil | 57.83 | 54.53 |
| Water | 0.10 | 0.15 |

The mineral oil constituent in the above two batches of grease consisted of 75% extract and 25% Pennsylvania 70 viscosity neutral oil, the mixture having a Saybolt Universal viscosity of 180–190 seconds at 210° F. The average penetrations of the product from the two batches were, respectively, 59.5 and 49.5 and the dropping points were, respectively, 428° F. and 435° F. (The methods by which penetrations and dropping points given herein were determined are hereinafter described.)

Batches No. 3 and No. 4

In these batches of grease the mineral oil constituent consisted of a mixture of 85% extract and 15% of 150 viscosity neutral oil. The constituents and proportions thereof entering into these batches were as follows:

|  | No. 3 | No. 4 |
| --- | --- | --- |
|  | Percent | Percent |
| "Hydrofol acid No. 51" | 36.01 | 31.54 |
| Flake caustic soda | 5.07 | 4.41 |
| Water | 5.07 | 4.41 |
| Mineral oil constituent | 53.85 | 59.64 |

The analyses of these finished greases were as follows:

|  | No. 3 | No. 4 |
| --- | --- | --- |
|  | Percent | Percent |
| Soda soap | 41.98 | 36.63 |
| Free caustic | 0.35 | 0.34 |
| Mineral oil | 57.47 | 62.83 |
| Water | 0.20 | 0.20 |

The average penetration of the above two batches of grease were, respectively, 47 and 59 and the dropping points were, respectively, 382° F. and 398° F.

Batch No. 5

A fifth batch of grease was made according to the formula of Batch No. 2 except that the mineral oil constituent consisted of 85% extract and 15% 150 viscosity neutral oil as in Batches Nos. 3 and 4. This grease was found to have a penetration value of approximately 40 and a dropping point of approximately 420° F. In actual performance it proved to be an excellent lubricant and maintained the bearings cool with a still lower consumption than Batch No. 2. However, due to its hardness, it was more difficult to handle in the grease guns or cups. Greases No. 3 and 4 give equally good performance and, being softer, are more easily handled.

The penetration figures given herein were determined by the standard method prescribed by the American Society for Testing Materials for determining the penetration of asphalt, using the standard prescribed needle weighted to a total of 100 grams. A cube of the grease to be tested was first maintained at a temperature of 77° F. for a period of twelve hours before testing.

The figures given represent the average of a number of tests on the same grease and are in tenths of millimeters penetrated by the needle in five seconds under the applied load using a New York State penetrometer.

The so-called dropping point of a grease is the temperature at which the grease softens to a predetermined extent. There are various methods of determining dropping point, sometimes erroneously called "melting point" and the temperature recorded depends to a considerable extent upon the particular method used. The method used in obtaining the dropping point temperatures given herein is that described on pages 14 and 15 of the 1937 edition of "American Society for Testing Materials Standards on Petroleum Products and Lubricants" with the following exceptions with respect to paragraph (e) thereof: In order more accurately to control the rate of temperature rise of the grease, a second thermometer is placed in the oil bath. The temperature of the bath is raised at the rate of 8 to 10° per minute until the bath temperature is 40° F. above the expected dropping point of the grease and then held at that temperature until a drop of grease falls.

By actual test of these greases, from the above-noted batches, on the crank pins of large, modern locomotives, exceptional grease economy and freedom from crank pin failures were experienced. Under conditions where such locomotives would normally pull into division points with literally pounds of grease hanging from their underside, where it had been thrown from the connecting rod bearings, and where pin failures were common using the conventional type of rod cup grease, no pin failures were experienced and there was little or no waste apparent.

In using grease from the No. 2 batch noted above, during over one thousand miles run under most severe conditions, the consumption was from one-third to one-half lower than that of the conventional grease. The No. 5 grease gave still lower consumption than No. 2 and the consumption of No. 3 was still lower. Specifically, the consumption of No. 2 grease was approximately 35 locomotive miles per pound; of No. 5 grease approximately 43 locomotive miles per pound; and of No. 3 over 45 miles per pound.

Even more important, from the standpoint of operating economy, is the saving in the brass bushings of the rods and pins. The use of our improved grease in regular service has reduced the consumption of such bushings by more than fifty percent.

In the appended claims the expression "hydrogenated fish oil fatty acids" is to be understood as meaning a fatty acid of the type previously defined herein as "Hydrofol acid No. 51" and the expression "extract" is to be understood to mean a residual product from the solvent extraction process previously described or a mineral oil material having substantially the same characteristics.

Further, the lubricating oil used for diluting the extract is designated in the appended claims as Pennsylvania neutral oil. This is a well known definition of a particular type of lubricating oil and is used herein to designate the characteristics rather than origin.

Though our new grease is particularly adapted to the lubrication of locomotive connecting rod bearings, it will be understood that it may be used with advantage for the lubrication of the bearings of other machines where comparable operating conditions exist.

We claim:

1. A lubricating grease comprising a mineral oil component thickened by the addition of a soap in which the major portion of the mineral oil component is extract obtained by the sulphuric acid-nitrobenzene treatment of a Pennsylvania-type oil.

2. A lubricating grease comprising a mineral oil component thickened by the addition of a soap in which approximately 75% or more of the mineral oil component is extract obtained by the sulphuric acid-nitrobenzene treatment of a Pennsylvania-type oil.

3. A lubricating grease comprising a mineral oil component thickened by the addition of a soap prepared from hydrogenated fish oil fatty acid and in which the major portion of the mineral oil component is extract obtained by the sulphuric acid-nitrobenzene treatment of a Pennsylvania-type oil.

4. A lubricating grease comprising a mineral oil component thickened by the addition of a soap prepared from hydrogenated fish oil fatty acid and caustic soda and in which approximately 75% or more of the mineral oil component is extract obtained by the sulphuric acid-nitrobenzene treatment of a Pennsylvania-type oil.

5. A substantially anhydrous lubricating grease comprising a mineral oil component thickened by the addition of a soda soap prepared from hydrogenated fish oil fatty acid and in which the major portion of the mineral oil component is extract obtained by the sulphuric acid-nitrobenzene treatment of a Pennsylvania-type oil.

6. A substantially anhydrous lubricating grease comprising a mineral oil component thickened by the addition of a soda soap prepared from hydrogenated fish oil fatty acid and in which the mineral oil component consists of extract obtained by the sulphuric acid-nitrobenzene treatment of a Pennsylvania-type oil, said extract being diluted with approximately 15 to 25%, based on total mineral oil component, of Pennsylvania neutral oil.

7. A substantially anhydrous lubricating grease comprising a mineral oil component thickened by the addition of a soda soap prepared from hydrogenated fish oil fatty acid and in which the mineral oil component consists of extract obtained by the sulphuric acid-nitrobenzene treatment of a Pennsylvania-type oil, said extract being cut back to a Saybolt Universal viscosity of approximately 400 seconds at 210° F. by the addition of Pennsylvania neutral oil having a Saybolt Universal viscosity of about 150 seconds at 100° F.

8. A substantially anhydrous locomotive rod cup grease comprising a mineral oil component thickened by the addition of a soda soap prepared from hydrogenated fish oil fatty acid and caustic soda and in which the mineral oil component consists of extract obtained by the sulphuric acid-nitrobenzene treatment of a Pennsylvania-type oil, said extract being cut back to a Saybolt Universal viscosity of approximately 400 seconds at 210° F., by the addition of Pennsylvania neutral oil, the ratio of soap to oil being from approximately 35% soap and 64% oil to approximately 45% soap and 54% oil.

9. A substantially anhydrous locomotive rod cup grease comprising a mineral oil component thickened by the addition of a soda soap prepared from hydrogenated fish oil fatty acid and caustic soda and in which the mineral oil component consists of extract obtained by the sulphuric acid-nitrobenzene treatment of a Pennsylvania-type oil, said extract being cut back to a Saybolt Universal viscosity of approximately 400 seconds at 210° F., by the addition of a Pennsylvania neutral oil having a Saybolt Universal viscosity of approximately 150 seconds at 100° F., said grease having substantially the following composition and properties: soda soap 41.98%; free caustic 0.35%; mineral oil component 57.47%; water 0.20%; penetration 45–50; and dropping point about 380° F.

10. A substantially anhydrous locomotive rod cup grease comprising a mineral oil component thickened by the addition of a soda soap prepared from hydrogenated fish oil fatty acid and caustic soda and in which the mineral oil component consists of extract obtained by a sulphuric acid-nitrobenzene treatment of a Pennsylvania-type oil, said extract being cut back to a Saybolt Universal viscosity of approximately 400 seconds at 210° F., by the addition of a Pennsylvania neutral oil having a Saybolt Universal viscosity of approximately 150 seconds at 100° F., said grease having substantially the following composition and properties: soda soap 36.63%; free caustic 0.34%; mineral oil 62.83%; water 0.20%; penetration approximately 60 and dropping point about 400° F.

NELSON J. GOTHARD.
GEORGE ENTWISTLE, JR.

CERTIFICATE OF CORRECTION.

Patent No. 2,245,772.                                                               June 17, 1941.

NELSON J. GOTHARD, ET AL.

It is hereby certified that error appears in the printed specification of the above numbered patent requiring correction as follows: Page 3, first column, line 41, for "and and" read --soap and--; and that the said Letters Patent should be read with this correction therein that the same may conform to the record of the case in the Patent Office.

Signed and sealed this 5th day of August, A. D. 1941.

(Seal)                                                                    Henry Van Arsdale,
Acting Commissioner of Patents.